United States Patent Office 3,421,343
Patented Jan. 14, 1969

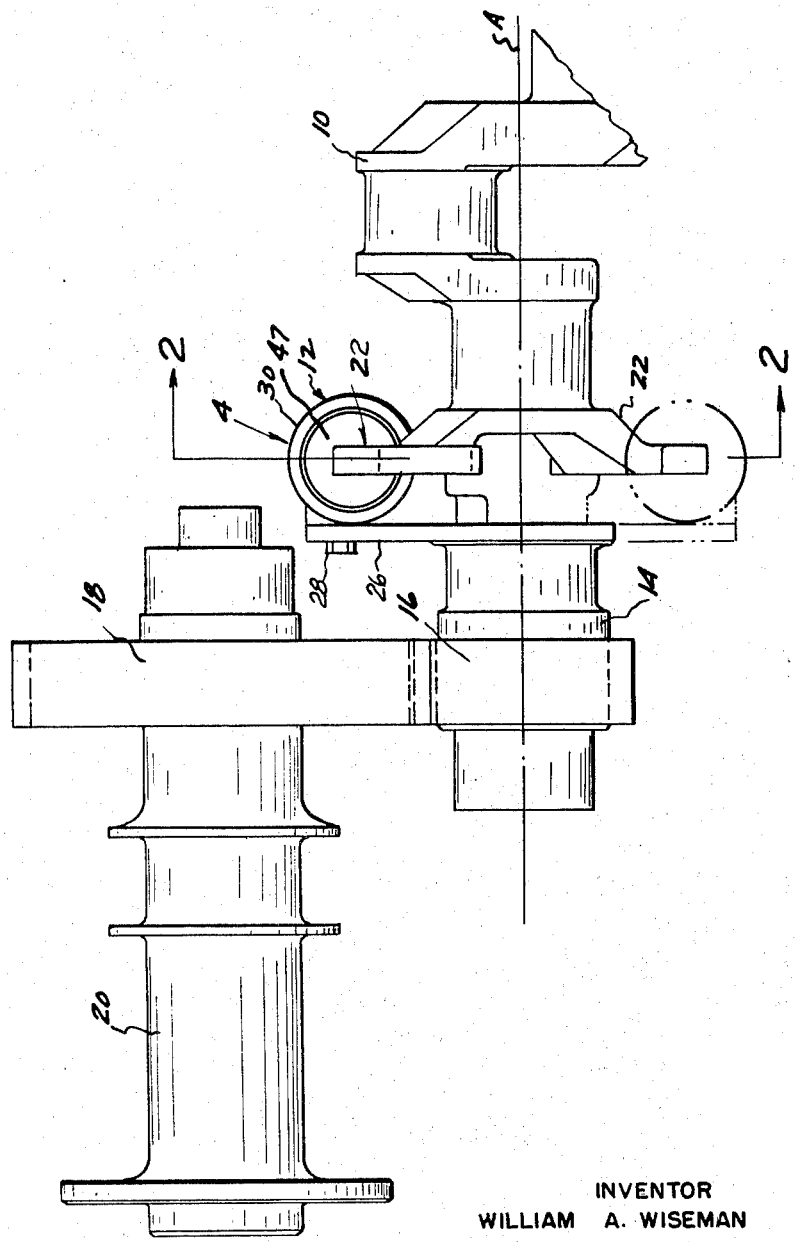

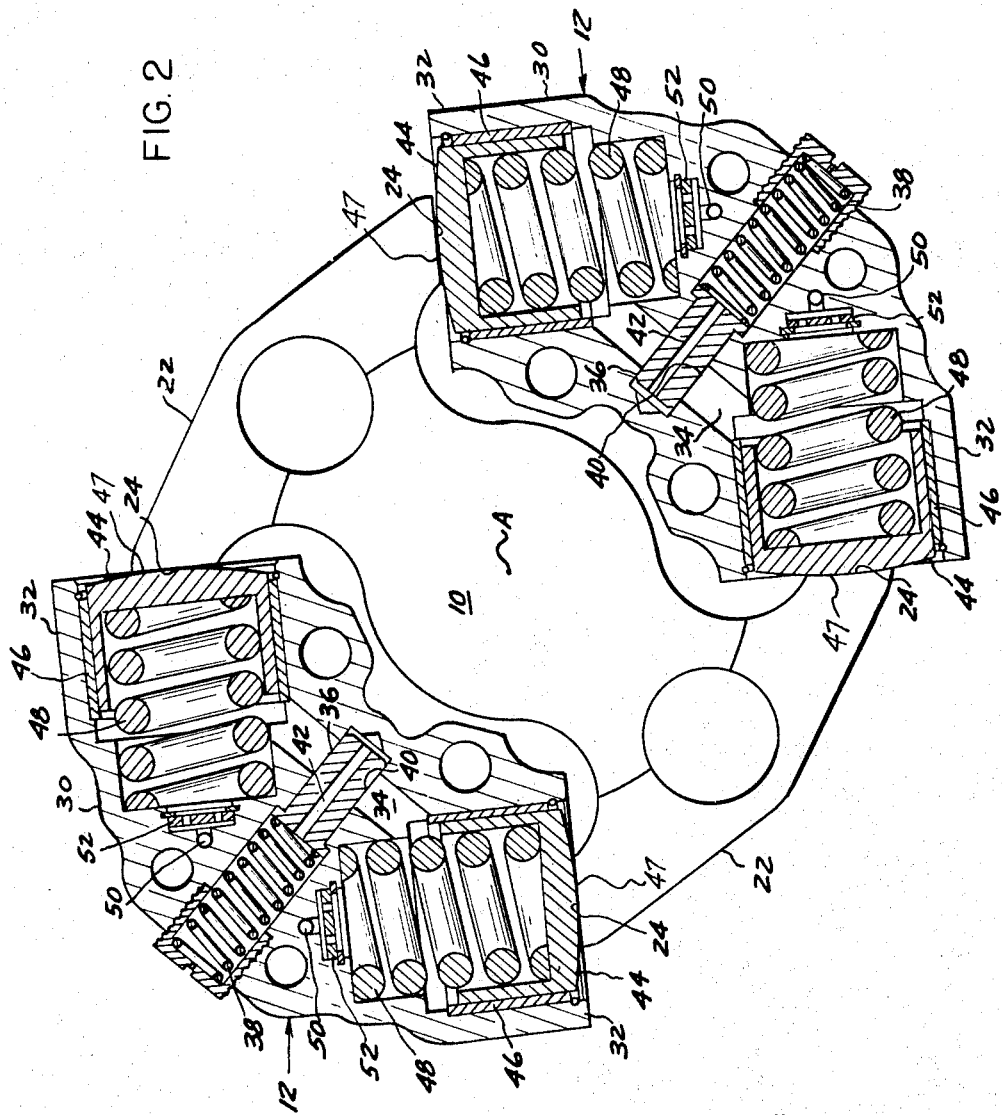

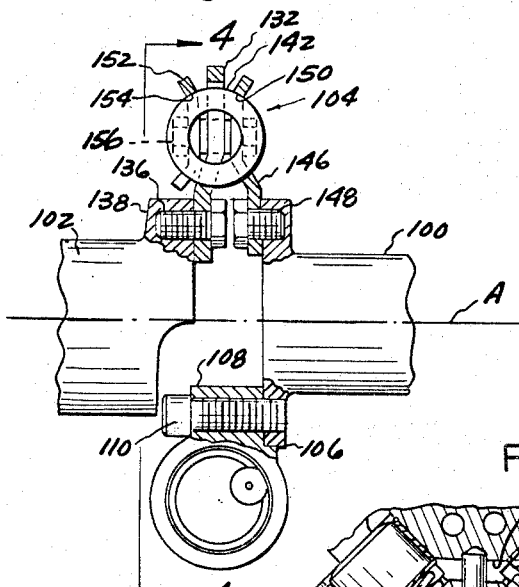
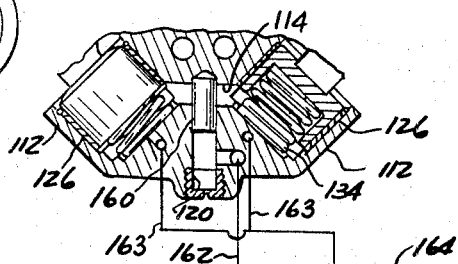
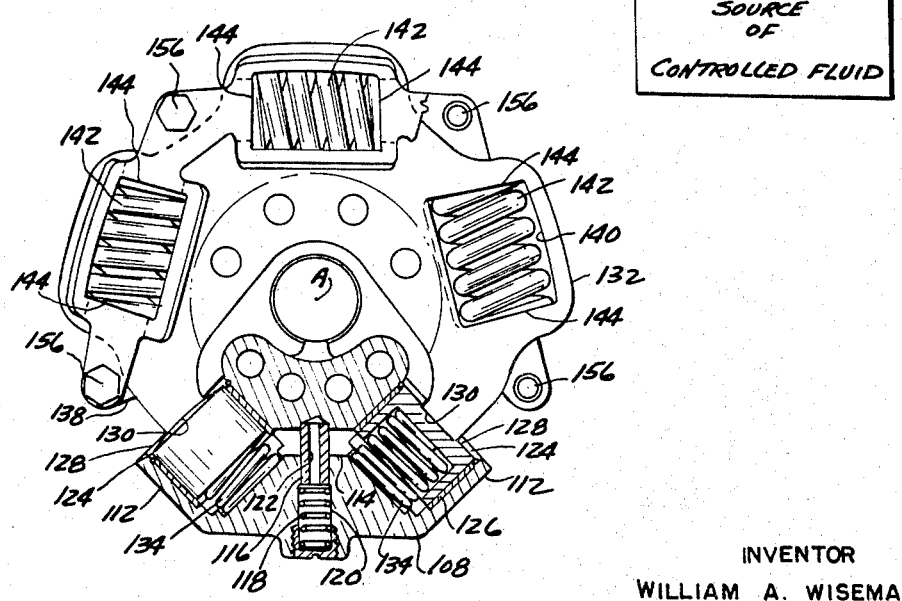

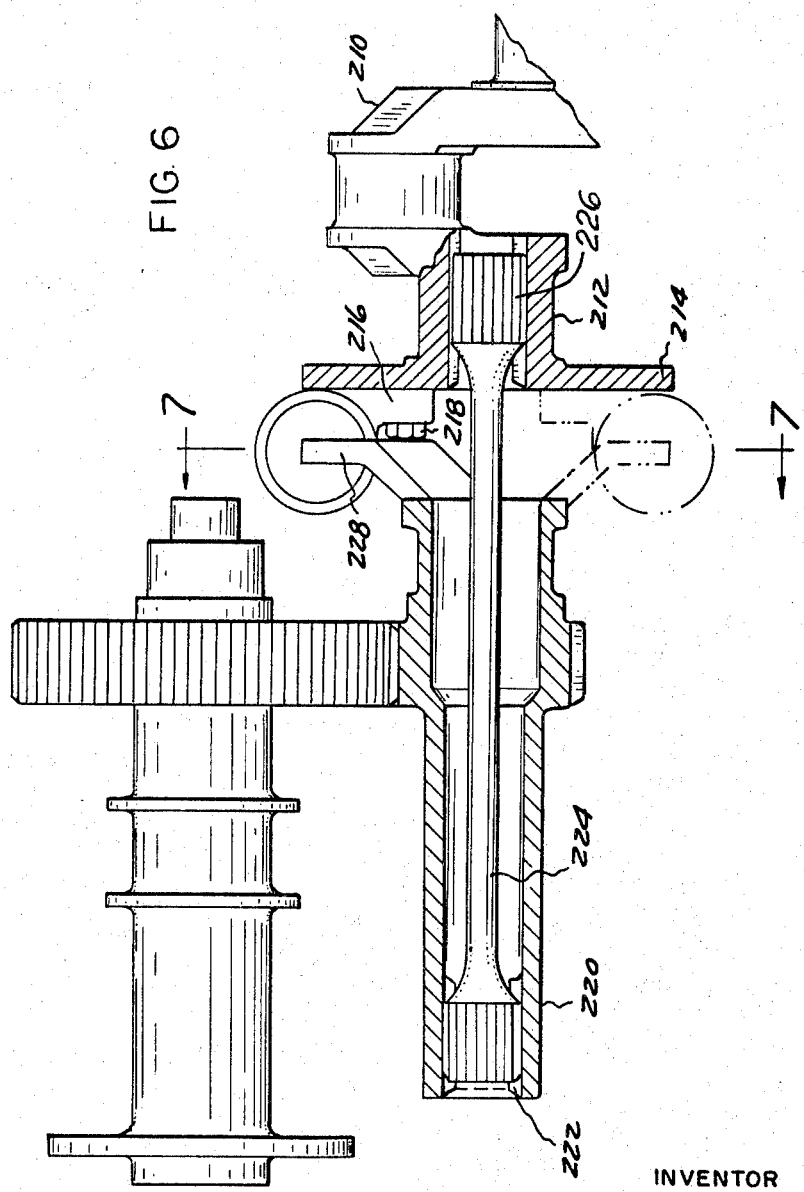

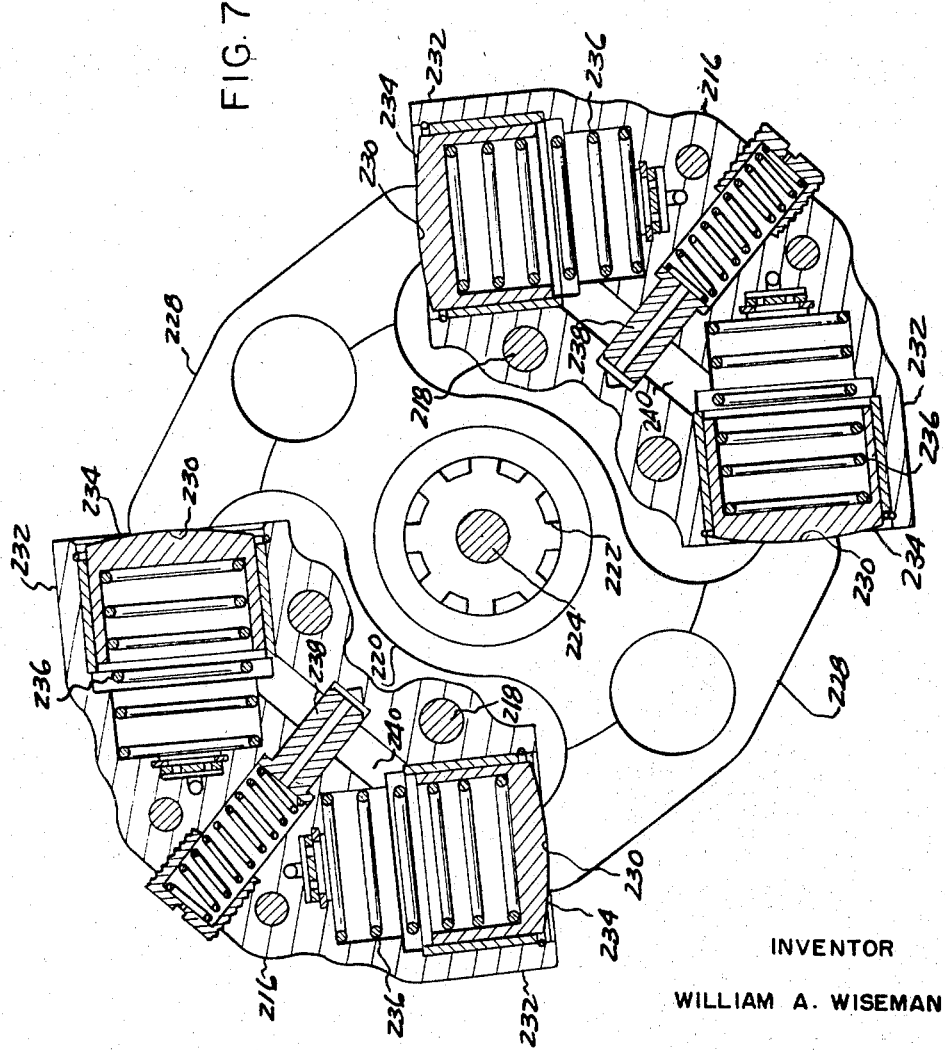

3,421,343
ENGINE DRIVE SYSTEM
William A. Wiseman, Muskegon, Mich., assignor to Continental Motors Corporation, Muskegon, Mich., a corporation of Virginia
Filed Aug. 1, 1966, Ser. No. 569,489
U.S. Cl. 64—27
Int. Cl. F16d 3/14
22 Claims

ABSTRACT OF THE DISCLOSURE

A driving system connecting the crankshaft of an engine with a driven shaft and including a first means providing a relatively rigid connection between the crankshaft and the driven member, a second means providing a resilient connection between the crankshaft and the driven member and a hydraulic system including a centrifugally movable valve member for automatically changing the connection from the first means to the second means at a predetermined speed to thereby change the natural frequency of the drive system and to avoid destructive resonant frequencies.

---

My invention relates to driving systems connecting the crankshaft of an engine with the driven output such as the propellor shaft of an aircraft engine, and more particularly to a drive system constructed to eliminate the buildup of resonant frequencies in such engines.

It is well know that at certain speeds, known as critical speed, rotating drive systems can become dynamically overstressed with large torsional amplitudes. This phenomenon is due to the resonance frequency when the rotation speed in revolutions per second corresponds to the natural frequencies or torsional vibration of the drive system.

The present invention is especially useful in geared drive systems which at some speed will produce such resonance frequencies producing destructive vibrations due to the presence of a resonant frequency which cannot be passed through without using some vibration damping device. In small engines particularly, conventional damping systems using heavy counterweights or pendulum dampers sacrifice light weight. Further, such pendulum dampers can only be tuned to one order of resonant frequency and will still permit vibrations at other orders.

An object of the present invention is to eliminate destructive vibrations in an engine drive system having a rotating driving member and a rotating driven member by providing an engagement between the two rotating members wherein the drive system has a relatively high natural frequency of vibration at relatively low rotating speeds and a relatively low natural frequency of vibration at relatively high rotating speeds so that the system will never operate at a speed matching the resonant frequency which would cause harmful buildup of vibrations.

Another object of the invention is to control the natural frequency of such a drive system by providing an engaging means responsive to the rotating speed of the driving member and operative at relatively high rotational speeds to provide the drive system with a relatively resilient low natural frequency and operating at relatively low rotational speeds to provide the system with a relatively stiff high natural frequency. By providing such a variable connection between the drive shaft and the driven shaft, extreme resonant frequencies can be effectively bypassed as the engine speed is increased.

A further object of the present invention is to avoid resonant vibrations in an engine drive system by providing an engagement between the driving and driven members having a selectively variable natural frequency so that the engine never has a natural resonant frequency corresponding to the rotating speed of the drive system.

For a more complete understanding of my invention reference may be had to the accompanying drawing illustrating a preferred embodiment of the invention in which like reference characters refer to like parts throughout the several views, and in which:

FIG. 1 is a fragmentary view of the preferred elements of the drive of an internal combustion engine with parts removed for purposes of clarity;

FIG. 2 is a cross-sectional view as seen from line 2—2 of FIG. 1;

FIG. 3 is an alternative embodiment of the present invention and is illustrated as a driving engagement between a driving member and a driven member and with parts shown in section;

FIG. 4 is a sectional view as seen from line 4—4 of FIG. 3;

FIG. 5 is a view of a selectively displaced valve with parts shown schematically;

FIG. 6 is a view similar to FIG. 1 but illustrating another embodiment of the invention; and FIG. 7 is a cross-sectional view as seen from line 7—7 of FIG. 6.

Referring to the drawings, in FIG. 1 a crankshaft 10 of an engine is shown as drivingly connected to a coupling 12 and having its output through an intermediate shaft 14 provided with a gear 16 meshed with a gear 18 carried by a driven output shaft 20 adapted in the present case for driving an aircraft propeller. The crankshaft 10 is provided on diametrically opposite sides with a pair of arms 22 which have their ends disposed to extend in a common plane of rotation substantially normal to and radially extending from the axis A of the crankshaft 10. As can be seen in FIG. 2, the ends of the arms 22 each have oppositely facing abutment ends 24.

The end of the shaft 14 is provided with a radial flange 26 (FIG. 1) on diametrically opposite sides of which are mounted, by any means such as bolts 28, a pair of spaced arm member 30 (FIG. 2) arranged to lie between the arm 22 of the crankshaft and in their plane of rotation. Each arm member 30 has a pair of oppositely extending cylinders 32 having their axes disposed to lie in a plane normal to the axis of rotation of the shaft 14, which is coaxial with the crankshaft 10, and having their inner ends connected by means of a cross passage 34 which will be normally blocked by a valve element 36 which is spring-loaded by a spring 38 to urge it into and across the passage 34. The valve element 36 is disposed in a recess 40 extending radially with respect to the axis A of the shaft 14, and crankshaft 10, such that when the engine is operating at speeds above a predetermined value, the valve element 36 will be moved by centrifugal forces radially outwardly against the urging of the spring 38 to thereby open the passage 34 connecting the inner ends of the cylinders 32. The valve element 36 has a bore 42 therethrough ot permit fluid trapped in the spring-carrying portion of the recess 40 to be expelled inwardly into the passage 34 when the valve is moved outwardly against the spring 38.

Each cylinder 32 carries within it a hollow piston member 44 slidably movable within a cylinder sleeve insert 46. Each piston member 44 has a closed outer end 47 engaging the abutment end 24 of an adjacent arm 32. A piston spring 48 disposed within the cylinder 32 and behind the piston 44 abuts the inner end of the cylinder 32 and urges the piston 44 at all times into engagement with the abutment end 24 of the respective arm 22.

Each member 30 has oil inlet passages 50 opening at the inner ends of the cylinders 32 through simple check valves 52 arranged to prevent fluid from leaving the cylinders 32. The oil inlet passages 50 are supplied with oil under pressure from any suitable source such as the engine oil system (not shown).

The valve element 36 is designed so that centrifugal forces in the lower rotational speed range are overcome by the springs 38 to thereby close the valves so that all oil in the cylinders 32 will be trapped therein, and the pistons 44 will provide at such times a substantially rigid connection between the crankshaft 10 and the shaft 14. In this condition, the drive system will have a relatively high natural resonant frequency. It will therefore be apparent, in operation, that when the drive system is rotating at relatively low rotational speeds and the natural frequency of the system is relatively high, resonant vibrations will not occur.

The valve element 36 is of such a mass that it will move outwardly under centrifugal force only when the crankshaft rotational speed increases to some selected value above the aforesaid relatively low rotational speed. As the value element 36 moves outwardly to open the passage 34, oil will not be trapped within the cylinders 32 but will be permitted to flow from one cylinder 32 to the other and the pistons 44 will therefore resiliently contact the arm ends 24 to provide a resilient engagement between the crankshaft 10 and the shaft 14. It will therefore be seen that at relatively high rotational speeds, the coupling not only provides a resilient engagement between the crankshaft 10 and the shaft 14 but in addition elasticity of this system has changed so that the drive system now has a relatively low natural frequency of vibration. By providing a relatively low natural frequency at relatively high rotational speeds, high resonant frequencies and their resultant destructive vibrations are avoided. The relative stiffness of the springs 48 may be selected to provide any desired difference between the two relative natural frequencies; that is, the stiffer the spring, the less the difference between the relatively low and high natural frequencies. The mass of the valve 36 and the stiffness of its spring 38 will be selected so that centrifugal forces will act to open the valve at a speed range intermediate those at which the natural reasonant frequencies would cause harmonic vibrations in the system.

The piston springs 48 are preferably also of a sufficient stiffness so that when the pistons 44 are unlocked and springs 48 are operative, the springs not only provide a resilient engagement, but in addition serve to damp and absorb other minor vibrations that might tend to build up in the system.

With this construction, it is possible for the engine to operate at different speed ranges without ever having to pass through a speed at which resonant frequencies could produce destructive vibrations in the system. This improved system replaces the heretofore used pendulum dampers and the like, resulting in a much less expensive engine having much less weight than was heretofore possible and providing smoother operational characteristics, particularly with regard to small engines.

It will be seen that when the engine is operating below a selected speed, the drive system has a relatively high natural frequency which is accomplished by having the valve element 36 closed, locking the pistons 44, and making the system stiff. This thereby eliminates any low speed resonant frequencies. When the engine is operating above the selected speed, the system has a relatively low natural frequency which is accomplished by having the valve element 36 open, unblocking the passage 34 between the cylinders 32 to thereby provide a resilient system having a relatively low natural frequency and eliminating any high speed resonant frequencies.

FIGS. 3 and 4 illustrate an alternate embodiment of the present invention wherein a rotating drive shaft 100 is drivingly connected to a driven shaft 102 by a coupling generally indicated by the reference numeral 104. The end of the drive shaft 100 is provided with a circumferential flange 106 which carries a radially extending arm member 108 by means such as bolts 110. The arm member 108 has a pair of oppositely extending cylinders 112 with their axes lying in a plane extending normal to the axis of rotation A of drive shaft 100. The inner ends of the cylinders are connected by a cross passage 114 normally blocked by a valve element 116 which is spring-loaded by a spring 118 to urge it into and across the passage 114. The valve element 116 is disposed in a recess 120 extending radially with respect to the axis A of the shaft 100. The valve element 116 is adapted to move outwardly under the influence of centrifugal forces when the driving shaft 100 is rotating at speeds above a predetermined value. The centrifugal forces created are sufficient to overcome the urging of the spring 118 thereby opening the passage 114 connecting the inner ends of the cylinders 112. The valve 116 has a bore 122 therethrough to permit fluid trapped in the spring carrying portion of the recess 120 to be expelled inwardly into the passage 114 when the valve moves outwardly against the spring 118.

Each cylinder 112 carries within in a hollow piston member 124 movable slidably within a cylinder sleeve insert 126. Each piston 124 has a closed outer end 128 which abuts the end 130 of an arm 132.

The arm 132 is fixed preferably by means of bolts 136 to a radial flange 138 provided on the end of the driven shaft 102. The abutment ends of the arm 132 are disposed in the plane of rotation of the piston carrying arm 108, which plane extends substantially normal to and radially from the axis of the driven shaft 102 which is coaxial with the axis A of the shaft 100.

The arm 132 is provided with preferably three spaced rectangular apertures 140, each of which carries a coil spring member 142. The springs are seated in the apertures 140 such that they present opposite abutment ends 144 which project from opposite surfaces of the arm 132.

A radially extending arm 146 is fixed to the circumferential flange 106 of the drive shaft 100 by bolts 148 and is provided with an aperture 150 corresponding to each of the springs 142.

A retainer member 152 having an aperture 154 associated with each of the springs 142 is engaged with the springs on the side of the arm 132 opposite to the side associated with the arm 146. The retainer member 152 is fixed to the arm 146 by bolts 156.

The valve element 116 is designed to function in a manner similar to the valve 36 in the aforementioned embodiment; i.e. it is closed in the lower rotational speed range so that oil in the cylinders 112 is trapped therein and the pistons 124 provide a rigid engagement between the drive shaft 100 and the driven shaft 102. With the pistons in the locked condition, the drive system has a relatively high natural frequency.

When the drive shaft rotates at a speed higher than the predetermined value, centrifugal force urges the valve 116 outwardly against the spring 118 to open the passage 114 so that the oil is permitted to flow from one cylinder 112 to the other. The arm 146 and the retainer member 152 then actively engage the springs 142 to assist in providing a resilient engagement between the shaft 100 and the shaft 102. The springs 142 are chosen of a stiffness sufficient to absorb minor harmonic oscillation and to cooperate with the piston springs 134 to provide the drive system with a relatively low natural frequency of vibration with respect to the high rotational speed.

In some cases it may be preferred or desirable to provide a valve 160 in the arm member 108 as shown in FIG. 5, and which is connected by a passage 162 to a source of controlled pressurized fluid 164. The valve 160 would be selectively moved across the passage 114 to control the rate of flow of fluid between the cylinders 112. To move the valve 160 radially inwardly and across the passage 114, fluid is delivered through passage 162 to the recess 120 behind the valve. As the valve 160 moves inwardly, it displaces a certain amount of fluid which would be returned by a passage 163 communicating the inner end of the cylinders 112 with the source of controlled fluid 164. To move the valve 160 radially outwardly, the fluid flow in passages 162 and 163 would be reversed and this in combination with the centrifugal force inherently produced upon rotation of the arm member 108 which permits the fluid pressure to get behind the valve 60 causes the valve 60 to be moved to its radially outermost position.

It is to be understood that the embodiment shown in FIG. 5 may be designed to be responsive to a function of the rotational speed of the driving member 100 and may be adapted to provide a selective opening in passage 114 for fluid flow associated with selective speeds. Thus there would be a different opening for different speeds, thereby providing controlled damping through the complete speed range.

It is apparent that although we have shown the arm 22 being carried by the crankshaft 10, the coupling 12 could be reversed so that the contact arms are carried by the intermediate shaft 14 and the cylinder carrying flange connected to the crankshaft 10. This configuration would have the same functional characteristics as the system heretofore described and in addition will provide the crankshaft with a uniform flange and also some additional mass to the crankshaft which may be desirable.

Furthermore, the two arms 22 which require special machining will be on the intermediate gear carrying shaft 14 which is a smaller part.

It has been mentioned that the stiffer the springs are that provide the relatively low resonant frequency, the smaller that gap between the two relative natural resonant frequencies which are selected in the system.

However, where a very small gap is desired, or where even the relatively low natural frequency selected or desired is still on a high order, or where it is desired to have only a small degree of resiliency in the higher speed-low resonance range, other means than the springs may be employed.

FIGS. 6 and 7 illustrate such a preferred embodiment in which a crankshaft 210 is provided with an internally splined hollow end 212 having a preferably circular flange 214 to which are secured arms 216 by any means such as bolts 218.

The intermediate shaft 220 in this case is hollow and internally splined as at 222 to connect with one splined end of a torsion quill shaft 224. The other splined end 226 of the quill shaft 224 is engaged in the splined end of the crankshaft 210.

The other end of the shaft 220 is provided with integrally radially extending arms 228 each having a pair of abutments 230 similar to those in the embodiment of FIGS. 1 and 2.

The arms 228 each have two cylinders 232 in which are carried pistons 234 engaging the abutments 230 similarly to the embodiment of FIGS. 1 and 2. Light-weight springs 236 may be used to insure abutting contact.

A spring-loaded, centrifugal force responsive valve element 238 is provided to responsively open and close the passage 240 connecting the fluid-filled interiors of the cylinders 232 as in the embodiment of FIGS. 1 and 2.

In this device, when the valve 238 is closed at relatively low speeds, the crankshaft 210 is connected rigidly with the shaft 220 through the pistons 234 to impart a relatively high natural resonance frequency to the system as in the previously described device, but when the valve 238 opens under influence of centrifugal force at relatively higher speeds, driving connection between the shafts 210 and 220 is through the relatively flexible quill shaft 224, giving to the system a relatively lower natural resonance frequency comparable to that which would be comparable to very stiff springs used in the embodiments of FIGS. 1 through 5.

The diameter and length, as well as the material, of the quill shaft 224 may readily be chosen to provide the natural resonance frequency desired.

It is also noted that the passage 240 in the present device may be sized to provide a more or less restricted orifice connection between the fluid-filled cylinders 232 which will act to damp out other minor vibrations, and the valve 238 itself may have therethrough a restricted orifice to permit some flow even when the valve 238 is closed, thereby providing damping through the entire range of engine operation. This type of vibration damping is also applicable to the other disclosed embodiments.

A further feature which may be incorporated into the present devices may be the use of a valve which acts over, for example, a 200 r.p.m. range between its closed and open positions to provide restricted orifice damping of fourth order vibration periods.

I claim:
1. In a drive system for engines including a rotating driving member and a rotating driven member,
   (a) a torsion quill shaft drivingly connecting said rotating members and constructed to provide said drive system with a first selected natural resonance frequency;
   (b) a selectively operative hydraulic cylinder-piston assembly drivingly connecting said rotating members and constructed when operative to provide said drive system with a second selected natural resonance frequency, and
   (c) means selectively making said cylinder-piston assembly operative.

2. The invention as defined in claim 1 wherein said last mentioned means includes an actuator therefor automatically operative in response to a selected variation of speed of said rotating members.

3. In a drive system for engines including a rotating driving member and a rotating driven member,
   (a) means providing a driving engagement between said driving member and said driven members, said means having a first operative condition wherein said drive system has a relatively high natural frequency and a second operative condition wherein said drive system has a relatively low natural frequency,
   (b) means operative in relation to the rotational speed of said driving member for making said engagement effective in the first operative condition at rotational speeds lower than those in which said high natural frequency is effective and making said engagement effective in the second operative condition at rotational speeds higher than those in which said low natural frequency is effective so that said driving member never operates at a speed which can produce resonant frequency vibrations in said drive system,
   (c) said driving engagement producing means comprising a cylinder carried by one of said rotating members and carrying a piston slidably therein, abutment means carried by the other of said rotating members and drivingly engaging said piston, means selectively varying admission of fluid behind said piston to vary the rigidity of the driving engagement with said abutment means, and
   (d) said driving engagement means further comprising a torsion quill shaft member drivingly connecting said rotating members and effective to provide a resilient drive therebetween when the rigidity of driving engagement between the piston and abutment means decreases to a selected value and to vary at such time the natural resonance frequency of said drive system.

4. In a drive system for engines including a rotating driving member driven by the engine and a rotating driven member connected to a shaft and rotating therewith,
   (a) means coupling said driving member and said driven member to transmit power from the engine to said shaft, (b) said coupling means comprising a first means rigidly connecting said driving member to said driven member in a manner which provides said drive system with a first selected natural resonance frequency, (c) said coupling means further comprising a second means resiliently connecting said driving member and said driven member and when operative providing said drive system with a second selected natural resonance frequency, and (d) means changing said coupling means from said first connecting means to said second connecting means.

5. The invention as defined in claim 4, and in which
(a) one of said rotating members has a cylinder rigidly connected to the end of said rotating member, said cylinder having an open end adjacent an abutment member of the second rotating structure;
(b) said coupling means comprises a piston slidable in said cylinder and with one end contacting said abutment member; and
(c) means for trapping a fluid in said cylinder behind said piston and effective to cause a rigid engagement between said piston and said abutment member at said lower speeds.

6. The drive system as defined in claim 4, and in which said last mentioned means comprises an actuator therefor automatically operable to change said coupling means from said first connecting means to said second connecting means in response to a selected variation in the speed of said rotating members.

7. The invention as defined in claim 4, wherein said coupling means includes,
(a) at least one arm rigidly connected to one of said rotating members, said arm extending radially and normally to the axis of said rotating member,
(b) a pair of spaced arms rigidly connected to the second of said rotating members and disposed in the plane of rotation of said first member arm and adjacent opposite sides thereof, and
(c) members disposed intermediate said adjacent arms and adapted to provide a rigid engagement between said arms when said first connecting means is operative and a resilient engagement between said adjacent arms when said second connecting means is operative.

8. The drive system as defined in claim 4, and in which said coupling means further comprises,
(a) at least one arm rigidly connected to one of said rotating members, said arm extending radially and normally to the axis of said rotating member,
(b) a pair of cylinders having open ends and connected adjacent opposite sides of said arm,
(c) a piston slidably carried in each of said cylinders and spring means resiliently urging said piston toward said arms,
(d) a pair of spaced arms rigidly connected to the second of said rotating members and disposed in the plane of rotation of said pistons and each of said spaced arms contacting the exposed end of at least one of said pistons, and
(e) said first connecting means including means for simultaneously trapping fluid in said cylinders behind said pistons for causing said pistons to rigidly engage the adjacent driving member arms at said lower speeds and said second connecting means comprising means relieving said fluid to cause said pistons to be moved by said spring means into contact with the adjacent driving member arms.

9. The drive system as defined in claim 4, and in which said coupling means comprises,
(a) at least one arm rigidly connected to one of said rotating members, said arm extending radially to the axis of said rotating members,
(b) said arm having a pair of relatively oppositely facing cylinders, (c) a piston slidably carried in each of said cylinders and spring means resiliently urging said piston outwardly,
(d) arm members carried by the second of said rotating members, said arm members disposed in the path of rotation of said pistons and adapted to rotate with said pistons, and
(e) said first connecting means including means for simultaneously trapping fluid in said cylinders behind said pistons for causing said pistons to rigidly engage the adjacent rotating member arm, and said second connecting means including means relieving said fluid to cause said pistons to be moved by said spring members to produce resilient engagement of said pistons and said adjacent rotating arm members.

10. The invention as defined in claim 9, wherein said last mentioned means comprises valve means operable to open and close communication between said cylinders behind said pistons.

11. The invention as defined in claim 9, wherein:
(a) said cylinder carrying arm has a passage connecting said cylinders behind said pistons; and
(d) said last mentioned means comprises a valve operative to block and to permit fluid flow through said passage between said cylinders.

12. The invention as defined in claim 11 and which spring means are disposed in said cylinders behind said pistons, said spring means providing resilient support for said pistons when said fluid passage is open.

13. The invention as defined in claim 11, wherein said valve comprises a piston element having means urging the piston element into said passage to block flow through same and operable to unblock said passage in response to a predetermined increase in driving member speed.

14. The invention as defined in claim 13, wherein said piston element is movable in a direction radial with respect to said rotating member axis whereby centrifugal forces of rotation will actuate said piston element in opposition to said urging means.

15. The invention as defined in claim 9, wherein
(a) said cylinder carrying arm has a passage connecting said cylinders behind said pistons; and
(b) said last mentioned means comprises a valve operative to throttle fluid flow through said passage between said cylinders.

16. The invention as defined in claim 15, wherein said last mentioned means comprises a valve element having means responsive to the rotation speed of said driving member for urging said valve element into said passage to throttle and unblock fluid flow through said passage between said cylinders.

17. The invention as defined in claim 16, wherein said urging means comprises a source of controlled fluid pressure communicating with opposite ends of said valve element and operative to dispose one end of said valve element in said passage.

18. The drive system as defined in claim 4, in which said coupling means includes,
(a) at least one arm member rigidly connected to one of said rotating members, said arm extending radially and normally to the axis of said rotating member,
(b) at least one arm rigidly connected to the second of said rotating members and disposed in the plane of rotation of said first arm member and adjacent opposite sides thereof, and
(c) means disposed intermediate said adjacent arms and operative to provide a rigid connection between said adjacent arms to provide said first connecting means and a resilient engagement between said adjacent arms to provide said second connecting means.

19. The drive system as defined in claim 4, and in which said coupling means comprises,
(a) at least one arm rigidly connected to one of said rotating members, said arm extending radially to the axis of said rotating member, (b) said arm having a pair of relatively oppositely facing cylinders,
(c) a piston slidably carried in each of said cylinders,
(d) said arm having a passage connecting said cylinders behind said pistons,
(e) an arm member carried by the second of said rotating member, said arm members disposed in the path of rotation of said pistons and adapted to rotate in combination with said pistons,
(f) means resiliently urging said pistons into engagement with said arm members,
(g) said first connecting means including means for trapping fluid in said cylinders behind said pistons for causing said pistons to rigidly engage the adjacent rotating arm members, and said second connecting means including means relieving said fluid to cause said spring means to urge said pistons into resilient engagement with the adjacent rotating member arms.

20. The drive system as defined in claim 4, and in which said coupling means comprises,
(a) a cylinder carried by one of said rotating members and carrying a piston slidably therein,
(b) abutment means carried by the other of said rotating members and drivingly engaging said piston,
(c) spring means resiliently urging said piston into engagement with said abutment means, and
(d) means for varying admission of fluid behind said piston to vary the rigidity of the driving engagement with said abutment means.

21. The invention as defined in claim 20 wherein said means varying fluid admission is operative to release fluid pressure behind said piston and the force of said spring means determines the degree of resilient driving connection between said piston and said abutment means.

22. In a drive system for engines including a rotating driving member driven by the engine and a rotating driven member connected to a shaft and rotating therewith,
(a) means coupling said driving member and said driven member to transmit power from the engine to said shaft,
(b) said coupling means comprising a hydraulic cylinder-piston assembly operable in a first operative position to rigidly connect said driving member to said driven member in a manner which provides the drive system with a first selected natural resonance frequency and including a spring means providing a resilient connection between said driving member and said driven member through said cylinder-piston assembly and when operative providing said drive system with a second selected natural resonance frequency, and
(c) means operable to render said spring means inoperative.

References Cited

UNITED STATES PATENTS

| | | | |
|---|---|---|---|
| 1,965,742 | 7/1934 | Junkers | 64—1 |
| 1,751,496 | 3/1930 | Sandner | 74—574 X |
| 1,865,116 | 6/1932 | Lee | 74—604 |
| 1,872,763 | 8/1932 | Lee | 74—604 |
| 2,248,791 | 7/1941 | Taylor | 74—604 |
| 2,277,186 | 3/1942 | Thege | 74—604 |
| 2,346,432 | 4/1944 | Heintz | 74—574 X |
| 2,367,709 | 1/1945 | Arkus-Duntov et al. | 74—574 |
| 3,296,887 | 1/1967 | Larsen | 74—574 |

MILTON KAUFMAN, *Primary Examiner.*

U.S. Cl. X.R.

74—574, 604